Feb. 9, 1965

A. G. BAKER ETAL 3,169,078

METHOD OF DISPENSING CEMENT AND
MELTING POT FOR USE THEREWITH

Filed Nov. 10, 1960

INVENTORS
Alan G. Baker
Jacob S. Kamborian
Roberts, Cushman & Grover
ATT'YS

INVENTORS
Alan G. Baker
Jacob S. Kamborian
Roberts, Cushman & Grover
ATT'YS 3,169,078
METHOD OF DISPENSING CEMENT AND MELT-
ING POT FOR USE THEREWITH
Alan G. Baker, Plymouth, Mass., and Jacob S. Kamborian,
133 Forest Ave., West Newton, Mass.; said Baker assignor to said Kamborian
Filed Nov. 10, 1960, Ser. No. 68,546
19 Claims. (Cl. 117—104)

This invention relates to the dispensing of liquid thermoplastic adhesive onto shoe parts preparatory to the adhesive bonding of the shoe parts.

Thermoplastic adhesives used for shoe manufacture are commonly referred to as cements and will be so designated in this specification. Recently, cements having high working temperatures and sharp melting points have been used in bonding shoe parts. Difficulties have arisen in using these cements because of the high working temperatures needed, the tendency of the cements to solidify if their temperature should drop a small amount, and the tendency of the cements to decompose and turn bad if they are not utilized a short time after they are melted.

Objects of the invention are to provide a method of dispensing cement in such fashion as to keep it at the proper temperature up to the time of application to the work; to provide a method of melting the cement in relatively small quantities at one time, so as to minimize decomposition and still insure a continuous and adequate supply without untoward delay; and to provide a method wherein the first cement melted is the first cement used up to minimize stagnation and deterioration of any part of the cement.

A further object of the invention is to provide a cement pot that is simple in its construction; easy to use; and still provides the advantages enumerated above.

In accordance with the method a pool of molten cement is provided within which the cement tends to flow toward one end, flow is restricted near the lower end of the pool so that a relatively small quantity of cement flows through the restricted portion at any given time, heat is supplied to the cement where it flows through the restriction so that when it enters the lower end of the pool it is at an optimum temperature for application to the work and cement is removed from the lower end only of the pool for application to the work. In further accordance with the method, a reservoir of molten cement is provided adjacent the one end of the pool from which cement may be discharged into the pool as the latter becomes depleted, whereupon a solid body of adhesive is placed in the reservoir which is of such volume as to discharge the melted adhesive from the reservoir into the pool to refill it. The pool is heated to keep the adhesive liquid and the reservoir is also heated to melt the solid adhesive at such a rate that the solid body is substantially reduced to liquid at about the same time that the pool is emptied in its normal use.

The cement pot comprises a block having in its top surface a relatively shallow trough for holding a pool of cement for the dipping of an applicator thereinto and adjacent one end a well or reservoir for holding a reserve supply of cement for discharge into the trough when the latter is depleted. The bottom of the trough slopes downwardly away from the top of the well and is divided into two sections, an upper section adjacent the well, into which cement is discharged from the well, and a lower section from which the cement is removed by an applicator. The walls of the trough near the lower end have inwardly projecting portions which, in conjunction with a knob situated in the trough between them, provide narrow passages which restrict the flow of cement so that as it passes through them into the lower end of the trough it can be heated to an optimum temperature for application to the work. The well is, in part, situated below the trough, is separated at the top from the trough by a lip and has upwardly diverging grooves in its walls through which cement is adapted to be elevated and discharged over the lip into the trough. A plurality of electric heater elements are located in the block to heat the well and the trough and a thermostat is positioned subjacent the trough and adjacent the restricted passageways to control the heaters. A cover plate is positioned over the block and contains an inclined hole through it to the lower end of the trough and a vertical hole through it directly above the top of the well. The first hole provides entrance for the applicator to permit it to be thrust into the pool for taking up a quantity of cement and the second hole provides for inserting solid pieces of cement to replenish the well.

Reference is now made to the following detailed description and to the accompanying drawing wherein.

Figure 2:
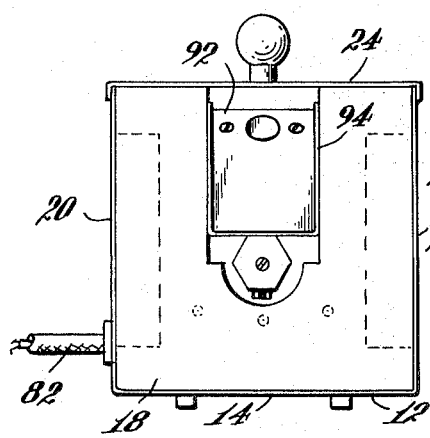
FIG. 2 is an end elevation of the melting pot looking from the right of FIG. 1.
Figure 3:
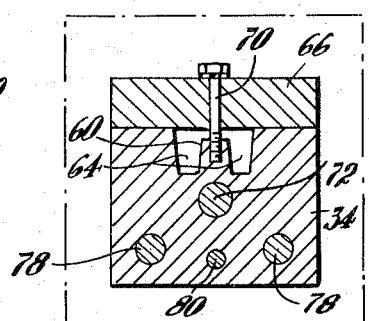
FIG. 3 is a section taken along the line 3—3 of FIG. 1 with the cement pot casing shown in phantom.

The melting pot 10 comprises a casing 12 preferably made of sheet metal. The casing includes a floor 14, vertical walls 16, 18, 20 and 22, and a cover 24 resting on the vertical walls. The floor 14 has a portion 26 extending beyond the wall 16 which forms a support for a junction box 28 to be described below.

Fiber discs 30 are positioned on the floor 14. A block of insulative material 32, preferably Marinite, is supported on the discs 30, and a block 34 of heat conductive material such as aluminum is supported on the insulative material 32. Headed screws 36 extend through holes in the discs 30 and insulative material 32 and are threaded into the base of the block 34. The heads of the screws 36 act as supports for the melting pot.

A recess 38 is formed in the upper surface of the block 34. A well 40 is located in a portion of the recess 38. The bottom wall 42 of the well is substantially circular. The side wall 44 of the well slopes uniformly upwardly and outwardly until it intersects the sloping bottom 46 of the recess 38. Ideally, the wall 44 should be at right angles to the bottom 42 of the well, but, in the process of casting the block 34 now employed, this cannot as a practical matter, be attained. Formed in the side wall 44 are a plurality of grooves 54 that extend radially outwardly of the side wall. Each groove has the same slope as the sidewall and extends from the bottom to the top of the well.

A portion of the recess 38 is formed into a trough 48 which provides a shallow pool from which cement may be removed, the trough being located adjacent the well 40. The well serves as a reservoir for replenishing the pool when the latter is emptied by use of the cement therein. The bottom wall 50 of the trough is at a higher level than the bottom 42 of the well and the trough and the well are separated by a lip 52 having a higher elevation than the trough and well bottoms. The trough is divided into two portions 56 and 58 of high and low elevation, which are separated by a knob 60 extending upwardly from the bottom wall 50 and projections 61 extending from the side walls 62 of the trough towards the knob 60. The spaces between the knob 60 and the projections 61 form a pair of restricted passageways 64 between the trough portions 56 and 68, having a smaller width than said trough portions. By causing the cement to flow through the relatively narrow passages while exposed to heat by contact with the surfaces of the passages, the cement may be raised to a temperature just before it flows into the lower end of the trough which is optimum for application to the work.

A cover plate 66 is swingably connected to the block 34 by hinge 68. In closed position, the cover plate 66 rests on the block 34 covering the recess 38 and is secured in place by a headed bolt 70 that extends through a smooth hole in the cover plate 66 and is threaded into a hole in the knob 60.

Figure 1:
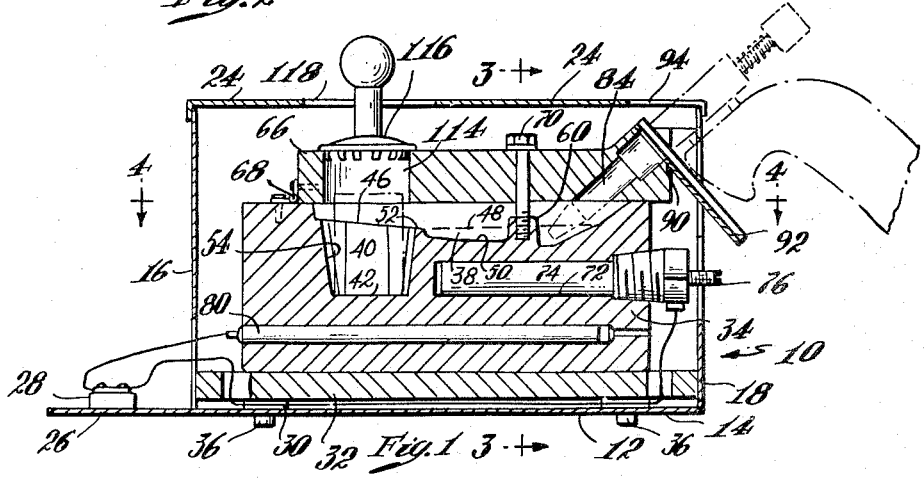
FIG. 1 is a side elevation partly in section of the melting pot with the applicator gun shown in phantom.
Figure 4:
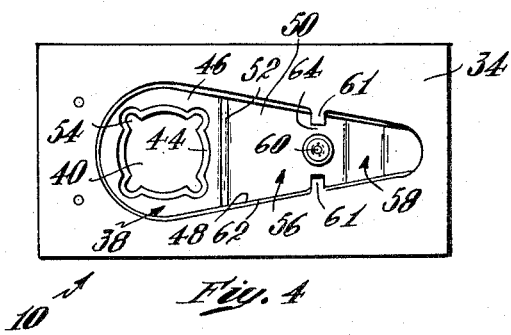
FIG. 4 is a top plan view taken along the line 4—4 of FIG. 1 showing the trough and the well in the block.
Figure 6:
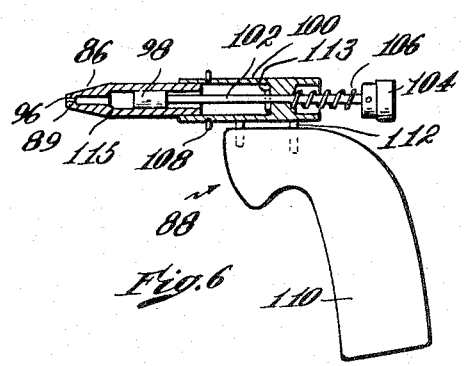
FIG. 6 is a side elevation view partly in section of the applicator gun.

The block 34 has a hole 72 therein that extends horizontally from the right side (FIG. 1) of the block beneath the recess 38, passes beneath the knob 60 and terminates short of the well 40. A thermostat 74 having an adjustment screw 76 is positioned in the hole 72 and is electrically connected to the junction box 28. Below the thermostat 74, the block 34 is provided with two relatively large electric heaters 78 and a relatively small electric heater 80, each of said heaters being located in a hole in the block 34 and electrically connected to the junction box 28 so as to be controlled by the thermostat. All of the heaters are postioned below both the recess 38 and the well 40. A cable 82 connects the junction box to a source of power.

The cover plate 66 has an inclined hole 84 extending therethrough at its forward end that is adapted to support the nozzle 86 of a dispenser gun 88 in position so that the tip 89 of the nozzle is immersed in melted cement lying in the portion 58 of the trough 48. The upper end of the hole 84 intersects an inclined surface 90 on the cover plate 66. A drip plate 92 is fastened to the surface 90 and extends downwardly and away from the cover plate 66. The casing 12 is cut away at 94 to accommodate both the dispenser gun and the drip plate.

The dispenser gun comprises the hollow nozzle 86 having a small dispensing opening 96 at its tip 89 and a piston 98 slidable in the nozzle. The nozzle 86 is connected to a casing 100. A piston rod 102 is slidably mounted in the casing and is connected at one end to the piston 98. The opposite end of the piston rod has a knob 104 mounted thereon. A compression spring 106 is coiled about the piston rod between the casing and the knob. A ring 108 is secured to the casing periphery, and a handle 110 is connected to the casing by rods 112. The piston 98 is normally urged away from the nozzle 86 by the spring 106 to a position where a stop pin 113 on the piston rod 102 engages the casing 100. By depressing the knob 104, the piston may be moved forwardly in the casing until the forward end of the piston engages a shoulder 115 of the nozzle 86.

The cover plate 66 has a hole 114 extending therethrough that is in alignment with the well 40 when the cover plate is in closed position. A removable cap 116 is provided that is adapted to cover the hole 114. The casing cover 24 has a hole 118 in alignment with the hole 114 and the well 40.

The melting pot is intended to be used in connection with the lasting of shoes wherein cement is dispensed in the angle between the lasting margin and the insole of a shoe mounted on a last and the lasting margin is then wiped over and folded down against the insole to adhesively bond the lasting margin to the insole. The cements recently developed for this purpose tend to be quick-setting, that is they tend to solidify and bind to the work soon after being applied to the work. In addition the cements tend to have a relatively high melting point and a relatively high working temperature. The cements also have a relatively sharp melting point, that is a relatively small drop in temperature from the working temperature will solidify the cements, and if the cements remain molten for too long a period of time before being applied to the work they tend to decompose and lose their adherent qualities. A typical cement of the type referred to has a melting point of from approximately 460° F. to 480° F. and a working temperature of from 500° F. to 530° F. It is highly desirable in using the aforementioned quick-setting cements to melt a small amount of the cement at a time, and to maintain the molten cement at the desired working temperature prior to dispensing the cement onto the work.

Figure 7:
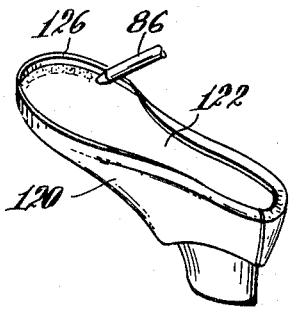
FIG. 7 is a perspective view showing how the applicator gun is used to apply cement to a shoe.
Figure 8:
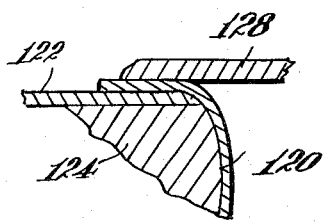
FIG. 8 is a partly sectional view showing a wiper wiping the lasting margin of a shoe upper down against the shoe insole after the cement has been applied to the shoe.
Figure 9:
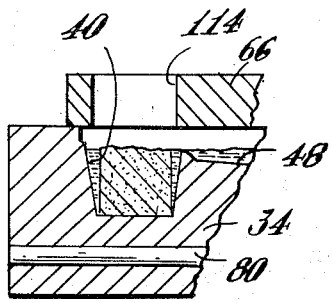
FIG. 9 is an elevation partly in section showing a solid block of cement displacing liquid cement out of the well into the trough.

The above described apparatus is used in conjunction with a shoe lasting machine such as that disclosed in Patent No. 2,888,693. The cap 116 is removed and a block of solid cement is placed in the well 40 and is then melted by the heaters 78 and 80. Ideally, the block when melted substantially fills the well 40. Preferably the rate of melting should be such that the block is melted in a space of time about equal that within which the cement is used up in the trough. After the block has melted, a new block of cement is placed in the well. Since the new cement has a higher density in its solid form than it has in its liquid form, the new block sinks to the bottom of the well. The new block of cement displaces the molten cement in the well 40, causes the molten cement to run up the grooves 54 (see FIG. 9), spill over the lip 52, and fall into the trough 48, substantially filling the trough and provides a shallow pool of liquid cement. The applicator gun 88 is now inserted into the hole 84 until the ring 108 rests on the drip plate 92 and the nozzle 86 is submerged in the molten cement in the trough portion 58. The knob 104 is now depressed by the operator's finger and then released causing molten cement to be sucked into the nozzle 86 of the applicator gun. The gun is then moved to the shoe lasting machine wherein there is placed a shoe upper 120 and an insole 122 mounted on a last 124 (see FIGS. 7 and 8). The knob 104 is depressed to cause the gun to extrude the molten cement in the angle between the lasting margin 126 of the upper and the insole. The wipers 128, one of which is shown in FIG. 8, are then moved against the lasting margin to wipe or fold the lasting margin down against the insole and adhesively bond the lasting margin to the insole. The gun is now replaced in the hole 84, the knob 104 is released to cause additional molten cement to be sucked into the nozzle. Another shoe is placed in the lasting machine and the gun is caused to extrude cement onto the shoe and the lasting margin is wiped against the insole. The drip plate 92 receives any cement dripping out of the nozzle when it is removed from the cover plate, thereby preventing this cement from accumulating on the casing, thermostat or other undesirable part of the cement pot. This operation continues until the supply of cement in the trough 48 is depleted. During the time the applicator gun 88 is resting in the hole 84, the nozzle 86 is heated due to the contact of the nozzle with the cover plate 66, the cover plate being heated by the heaters 78, 80. The residual heat in the nozzle 86 is sufficient to maintain the cement in the applicator gun molten in the short time that it takes to take the applicator gun out of the hole 84 and extrude the cement onto the work. The contact of the nozzle with the hot cover plate also serves to melt any cement that may have solidified in the applicator gun.

Due to the location of the thermostat 74 immediately below the trough 48, the heaters 78 and 80 can readily be controlled to maintain the cement in the trough 48 at the desired working temperature. The bottom of the trough portion 58 is lower than the bottom of the trough portion 56. The cement therefore gravitates to the trough portion 58. The cement in getting to the trough portion 58, where it is picked up by the gun, must pass through the restricted passages 64 between portions 60 and 61 of the heat conductive block 34. Heat radiating against the cement while it passes through the passages 64 insures that the cement is at the proper working temperature when it reaches the trough portion 58 and is sucked into the gun 38. After the cement in the trough 48 has been depleted, a new block of cement is placed in the well 40 thereby displacing the now molten cement in the well and causing it to run up the grooves 54 and spill over the lip 52 into the trough 48.

The above described operation and sequence of steps insures that a relatively small amount of cement is molten at any given time to reduce the chances of the cement decomposing due to overheating. Due to the use of the solid cement to displace the molten cement, earlier melted cement is supplied to the gun prior to later melted cement, and a new supply of cement is melted while a previously melted supply is being used by the gun to be applied to the shoe. Of course, the cap 116 is removed when the block of cement is inserted in the well 40 and is replaced after the insertion of the block.

Figure 5:
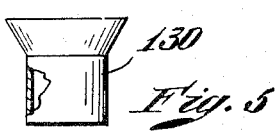
FIG. 5 is a view of the funnel which may be used to supply cement crystals to the melting pot.
Figure 10:
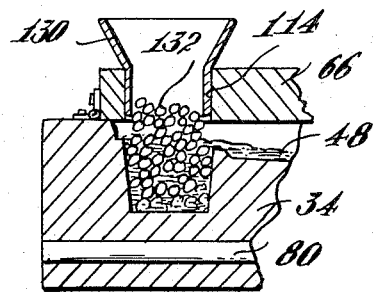
FIG. 10 is an elevation partly in section showing cement crystals in the well displacing the liquid cement out the well and into the trough.

Instead of using a block of cement, small particles or crystals 132 of solid cement may be inserted in the well. When using crystals, the funnel 130 (FIG. 5) is inserted in the hole 114 and the crystals are poured into the funnel. As the crystals fall into the molten cement in the well they tend to fuse and form a solid mass of cement which displaces the molten cement in the manner described above (see FIG. 10). Ideally, the amount of crystals poured in the well should be just enough to displace the molten cement in the well and to substantially fill the well when the crystals are melted. However, if more than this amount of crystals are poured, the column of crystals will tend to melt from the bottom and the molten cement will tend to be displaced into the trough as it melts. This arrangement has proven satisfactory so long as the molten cement is picked up from the trough by the applicator gun at a rate commensurate with the rate at which the column of crystals melts in the well.

It should be understood that the present disclosure is for the purpose of illustration only and this invention includes all modifications that come within the scope of the appended claims. For example, the work parts to be bonded may be parts other than the lasting margin and insole of a shoe, and an applicator other than that disclosed may be used to pick up the cement from the trough.

We claim:

1. The method of dispensing molten cement comprising the steps of providing a trough and a well with molten cement therein and a lip positioned between the trough and well having a higher elevation than the adjacent bottoms of the trough and well; applying heat to the trough and the well to maintain the cement molten; periodically picking up a supply of molten cement from the trough and applying it to a work part until the cement in the trough has been substantially depleted; placing solid cement in the well in sufficient quantity to cause substantially all the molten cement in the well to be displaced therefrom over the lip into the trough; resuming the periodical picking up of molten cement from the trough; and continuing to apply heat to the trough and the well to maintain the cement in the trough molten and to cause the solid cement in the well to melt.

2. The method of dispensing molten cement comprising the steps of: providing a trough and a well with molten cement therein and a lip positioned between the trough and well having a higher elevation than the adjacent bottoms of the trough and well; applying heat to the trough and the well to maintain the cement molten; periodically picking up a quantity of molten cement from the trough and applying it to a work part until the cement in the trough has been substantially depleted; forcing a block of solid cement into the well of sufficient size to thereby displace substantially all the molten cement therefrom over the lip into the trough; resuming the periodical picking up of molten cement from the trough; and continuing to apply heat to the trough and the well to maintain the cement in the trough molten and to cause the solid cement in the well to melt.

3. The method of dispensing molten cement comprising the steps of: providing a trough and a well with molten cement therein and a lip positioned between the trough and well having a higher elevation than the adjacent bottoms of the trough and well; applying heat to the trough and the well to maintain the cement molten; periodically picking up a quantity of molten cement from the trough and applying it to a work part until the cement in the trough has been substantially depleted; pouring small particles of solid cement into the well in sufficient quantity to displace substantially all of the molten cement from the well over the lip into the trough, the particles tending to fall to the bottom of the well and to initially fuse into a solid mass upon being heated; resuming the periodical picking up of molten cement from the trough; and continuing to apply heat to the trough and the well to maintain the cement in the well molten and to cause the solid cement in the well to melt.

4. A cement melting pot comprising a block having a trough and a well in its upper surface, a lip positioned between the trough and the well having a higher elevation than the adjacent bottoms of the trough and the well, and a restricted passageway intermediate the ends of the trough of a smaller width than the portions of the trough adjacent said passageway.

5. The melting pot according to claim 4, wherein means are provided for applying heat to the trough and well, and control means for said heat applying means are positioned in the block subjacent the trough and adjacent the restricted passageway.

6. A cement melting pot comprising a block having a trough and a well in its upper surface, a lip positioned between the trough and the well having a higher elevation than the adjacent bottoms of the trough and the well, a restricted passageway intermediate the ends of the trough of a smaller width than the portions of the trough adjacent said restricted passageway, means for applying heat to the trough and the well, control means for said heat applying means positioned in the block subjacent said trough and adjacent said restricted passageway, and means for removably supporting an applicator in such a position that the applicator tip is positioned in the trough on the side of the restricted passageway remote from the well.

7. A cement melting pot comprising a block having a trough and a well in its upper surface, a lip positioned between the trough and the well having a higher elevation than the adjacent bottoms of the trough and the well, a restricted passageway intermediate the ends of the trough of a smaller width than the portions of the trough adjacent said passageway, means for applying heat to said trough and well, control means for said heat applying means positioned subjacent said trough and adjacent said restricted passageway, a cover positioned over the trough, and a hole extending through the cover having its axis directed toward the portion of the trough on the side of the restricted passageway remote from the well for removably supporting an applicator with its tip in said portion of the trough.

8. The melting pot according to claim 7 wherein the well has a side wall and a bottom wall and at least one groove extending from the bottom to the top of the side wall.

9. A cement melting pot comprising a block having a trough and a well in its upper surface, a lip positioned between the trough and the well having a higher elevation than the adjacent bottoms of the trough and the well, a knob rising upwardly from the trough bottom and positioned intermediate the ends of the trough, projections extending inwardly from the side walls of the trough adjacent the knob, the space between the knob and the projections forming a pair of restricted passageways of a smaller width than the portions of the trough adjacent said passageways, electric heating means located in the block for applying heat to said trough and well, control means for said heating means positioned subjacent said trough and adjacent said restricted passageways, a cover plate hingedly connected to said block and extending over said trough and said well, a hole extending through the cover plate in alignment with the well, a bolt extending through the cover plate and threaded into said knob for locking the cover plate in position, and a hole extending through the cover plate having its axis directed toward the portion of the trough on the side of the restricted passageway remote from the well for removably supporting an applicator with its tip in said portion of the trough.

10. The method of dispensing molten cement comprising, providing a pool of molten cement from which cement may be removed in predetermined amounts, said pool containing more than enough cement to supply said predetermined amount, providing a reservoir of molten cement of such quantity as to replenish the pool when the latter has been substantially emptied by removal of cement therefrom in said predetermined amounts, providing a lip positioned between the pool and reservoir having a higher elevation than the adjacent bottoms of the pool and reservoir, when the pool is substantially emptied placing a solid body of cement in the reservoir of such volume as to displace substantially all the molten cement therefrom over the lip into the pool, and supplying heat to the cement in the reservoir at a rate to substantially melt the solid cement by the time the pool is again emptied by removal of cement therefrom.

11. The method of dispensing molten cement comprising, providing a pool of molten cement from which cement may be removed in predetermined amounts, said pool containing more than enough cement to supply said predetermined amount, providing a reservoir adjacent the pool with its bottom below the bottom of the pool and its rim above the bottom of the pool for containing molten cement of such quantity as to replenish the pool when the latter has been substantially emptied by removal of cement therefrom, when the pool is substantially emptied placing a solid body of cement in the reservoir of such volume as to displace substantially all the molten cement therefrom upwardly over the rim into the pool, supplying heat to the molten cement in the pool to keep it fluid and to the cement in the reservoir to melt the solid body therein at such a rate that the solid body will be substantially melted by the time the pool is depleted.

12. The method of dispensing molten cement comprising: providing a trough with molten cement therein, a well supporting a column of solid cement and a lip positioned between the trough and well having a higher elevation than the adjacent bottoms of the trough and well; applying heat to the trough and the well to maintain the cement in the trough molten and to melt the column of solid cement in the well from the bottom so that the column of solid cement continuously displaces previously melted cement from the well over the lip into the trough; and periodically picking up a quantity of molten cement from the trough and applying it to a work part at a rate that is commensurate with the rate that the molten cement is displaced from the well into the trough.

13. The method according to claim 12, further comprising: forming said column by pouring small particles of solid cement into the well so that the particles fall to the bottom of the well forming a solid mass which displaces the melted cement from the bottom.

14. A cement melting pot comprising: a block having a trough and a well in its upper surface; a lip positioned between the trough and the well having a higher elevation than the adjacent bottoms of the trough and the well; a restricted passageway intermediate the ends of the trough of a smaller width than the portions of the trough adjacent said passageway; means for applying heat to the trough and the well; and means for removably supporting an applicator in such a position that the applicator tip is positioned in the trough on the side of the restricted passageway remote from the well.

15. A cement melting pot comprising: a block having a trough and a well in its upper surface; a lip positioned between the trough and the well having a higher elevation than the adjacent bottoms of the trough and the well; a restricted passageway intermediate the ends of the trough of a smaller width than the portions of the trough adjacent said passageway; means for applying heat to said trough and well; a cover positioned over the trough; and a hole extending through the cover having its axis directed toward the portion of the trough on the side of the restricted passageway remote from the well for removably supporting an applicator with its tip in said portion of the trough.

16. A cement melting pot comprising: a block having a trough in its upper surface; a restricted passageway intermediate the ends of the trough of a smaller width than the portions of the trough adjacent said passageway; means for applying heat to the trough; and means for enabling molten cement to be discharged into the portion of the trough located on one side of the restricted passageway.

17. The cement pot according to claim 16, wherein the trough is so constructed that the portion of the trough at one side of the restricted passageway is at a higher elevation than the portion of the trough at the other side of the restricted passageway.

18. The cement pot according to claim 16, further comprising: control means for said heat-applying means positioned in the block subjacent the trough.

19. The cement pot according to claim 16, further comprising: means for removably supporting an applicator in such a position that the applicator tip is positioned in the portion of the trough that is located on the other side of the restricted passageway.

References Cited in the file of this patent

UNITED STATES PATENTS

| | | |
|---|---|---|
| 1,010,364 | Hearron | Nov. 28, 1911 |
| 1,436,247 | Hagan | Nov. 21, 1922 |
| 1,916,186 | Meunier | June 27, 1933 |
| 2,011,639 | Johannesson | Aug. 20, 1935 |
| 2,039,177 | MacKenzie | Apr. 28, 1936 |
| 2,841,111 | Walker | July 1, 1958 |
| 2,871,818 | Jorgensen | Feb. 3, 1959 |
| 2,910,960 | Markes | Nov. 3, 1959 |
| 2,916,057 | Carle et al. | Dec. 8, 1959 |
| 2,972,670 | Dorosz et al. | Feb. 21, 1961 |